United States Patent
Neill et al.

(10) Patent No.: US 11,763,662 B2
(45) Date of Patent: Sep. 19, 2023

(54) SYSTEMS AND METHODS OF ENFORCING DYNAMIC THRESHOLDS OF SOCIAL DISTANCING RULES

(71) Applicant: Johnson Controls Tyco IP Holdings LLP, Milwaukee, WI (US)

(72) Inventors: Terence Neill, Lisburn (GB); Alexis B. Ehrlich, Boca Raton, FL (US)

(73) Assignee: JOHNSON CONTROLS TYCO IP HOLDINGS LLP, Milwaukee, WI (US)

(*) Notice: Subject to any disclaimer, the term of this patent is extended or adjusted under 35 U.S.C. 154(b) by 225 days.

(21) Appl. No.: 17/210,276

(22) Filed: Mar. 23, 2021

(65) Prior Publication Data

US 2022/0309904 A1  Sep. 29, 2022

(51) Int. Cl.
  *G08B 21/24* (2006.01)
  *G06V 20/52* (2022.01)
  *G06V 40/16* (2022.01)
  *G06V 10/40* (2022.01)

(52) U.S. Cl.
  CPC ........... *G08B 21/245* (2013.01); *G06V 10/40* (2022.01); *G06V 20/52* (2022.01); *G06V 40/171* (2022.01); *G06V 40/172* (2022.01)

(58) Field of Classification Search
  USPC .................................................. 382/103, 118
  See application file for complete search history.

(56) References Cited

U.S. PATENT DOCUMENTS

| 11,615,620 B2* | 3/2023 | Adam ..................... G06V 20/41 382/103 |
| 2021/0280322 A1* | 9/2021 | Frank ..................... G16H 50/20 |
| 2022/0269878 A1* | 8/2022 | Neill ..................... G06V 40/171 |
| 2022/0300727 A1* | 9/2022 | Ehrlich .................. G06V 20/52 |
| 2023/0023148 A1* | 1/2023 | Kuta .................. G06V 10/7715 |

OTHER PUBLICATIONS

Adarsh Jagan Sathyamoorthy et al: "COVID-Robot: Monitoring Social Distancing Constraints in Crowded Scenarios", ljarxiv.org, Cornell University Library, 201 Olin Library Cornell University Ithaca, NY 14853, Aug. 14, 2020 [Aug. 14, 2020], XP081742097 (Year: 2020).*

(Continued)

*Primary Examiner* — Ishrat I Sherali
(74) *Attorney, Agent, or Firm* — ArentFox Schiff LLP

(57) ABSTRACT

Example aspects include a method, apparatus and computer-readable medium of enforcing dynamic social distancing rules, comprising monitoring video frames of one or more video feeds, classifying a plurality of persons in the video frames, calculating respective distances between each person of the plurality of persons and remaining persons of the plurality of persons, detecting mask usage of the plurality of persons, measuring a dwell time of the plurality of persons, determining whether the plurality of persons are in violation of the dynamic social distancing rules, and generating an alert. The mask usage indicating whether each person of the plurality of persons is wearing a mask. The dwell time indicating a duration of time that each person of the plurality of persons has been within a proximity threshold to the remaining persons of the plurality of persons.

20 Claims, 5 Drawing Sheets

(56) References Cited

OTHER PUBLICATIONS

Yadav Shashi: "Deep Learning based Safe Social Distancing and Face Mask Detection in Public Areas for COVID-19 Safety Guidelines Adherence", International Journal for Research in Applied Science and Engineering Technology, vol. 8, No. 7, Jul. 1, 2020 [Jul. 1, 2020], pp. 1368-1375, XP055847651, DOI: 1 (Year: 2020).*

Sanjay et al., Monitoring of Social distancing & Face mask Using CNN, IEEE 2021 978-1-6654-2503-2/21, pp. 1-6. (Year: 2021).*

International Search Report and Written Opinion issued in corresponding International Application No. PCT/US2022/071275 dated Jul. 4, 2022.

Adarsh Jagan Sathyamoorthy, et al.: "Covid-Robot: Monitoring Social Distancing Constraints in Crowded Scenarios" arxix.org, Cornell University Library, 201 Olin Library Cornell University, Ithaca, NY 14853, Aug. 14, 2020 (Aug. 14, 2020), XP081742097, p. 1, last par. to p. 2, first par. p. 3, last par. to p. 5 right, col. p. 7, right col. Section C.

Yadav Shashi: Deep Learning based Safe Social Distancing and Face Mask Detection in Public Areas for COVID-19 Safety Guidelines Adherence, International Journal for Research in Applied Science and Engineering Technology, vol. 8, No. 7, Jul. 1, 2020 (Jul. 1, 2020) pp. 1368-1375. XP055847651.

\* cited by examiner

SYSTEMS AND METHODS OF ENFORCING DYNAMIC THRESHOLDS OF SOCIAL DISTANCING RULES

BACKGROUND

Technical Field

The present disclosure relates generally to video monitoring systems, and more particularly, to systems and methods for using video analytics to enforce dynamic thresholds of social distancing rules.

Introduction

Video surveillance systems may frequently be used to monitor desired environments, such as, but not limited to, retail store premises, office buildings, distribution centers, factories, parks, and sidewalks. Furthermore, entities that own, manage, or use such environments may implement dynamic social distancing rules designed to reduce the spread of a contagious disease (e.g., COVID-19) by occupants or visitors to those environments. For example, certain thresholds and/or parameters of the dynamic social distancing rules (e.g., minimum distance between two persons) may dynamically change based on one or more factors (e.g., mask usage, geographic location). However, conventional video surveillance systems may not provide solutions for enforcement of dynamic thresholds of social distancing rules. Thus, there exists a need for further improvements to video surveillance systems. Improvements are presented herein. These improvements may also be applicable to other systems that employ video analysis.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method of enforcing dynamic social distancing rules, comprising monitoring video frames of one or more video feeds. The method further includes classifying a plurality of persons in the video frames. Additionally, the method further includes calculating respective distances between each person of the plurality of persons and remaining persons of the plurality of persons. Additionally, the method further includes detecting mask usage of the plurality of persons. The mask usage indicating whether each person of the plurality of persons is wearing a mask. Additionally, the method further includes measuring a dwell time of the plurality of persons. The dwell time indicating a duration of time that each person of the plurality of persons has been within a proximity threshold to the remaining persons of the plurality of persons. Additionally, the method further includes determining whether the plurality of persons are in violation of the dynamic social distancing rules based at least on the respective distances, the mask usage, and the dwell time. Additionally, the method further includes generating an alert in response to determining that the plurality of persons are in violation of the dynamic social distancing rules.

Another example aspect includes an apparatus for enforcing dynamic social distancing rules, comprising a non-transitory memory storing computer-executable instructions, and a processor communicatively coupled with the non-transitory memory. The processor is configured to execute the computer-executable instructions to monitor video frames of one or more video feeds. The processor is further configured to execute further instructions to classify a plurality of persons in the video frames. Additionally, the processor is further configured to execute further instructions to calculate respective distances between each person of the plurality of persons and remaining persons of the plurality of persons. Additionally, the processor is further configured to execute further instructions to detect mask usage of the plurality of persons. The mask usage indicating whether each person of the plurality of persons is wearing a mask. Additionally, the processor is further configured to execute further instructions to measure a dwell time of the plurality of persons. The dwell time indicating a duration of time that each person of the plurality of persons has been within a proximity threshold to the remaining persons of the plurality of persons. Additionally, the processor is further configured to execute further instructions to determine whether the plurality of persons are in violation of the dynamic social distancing rules based at least on the respective distances, the mask usage, and the dwell time. Additionally, the processor is further configured to execute further instructions to generate an alert in response to determining that the plurality of persons are in violation of the dynamic social distancing rules.

Another example aspect includes a non-transitory computer-readable medium storing computer-readable instructions for enforcing dynamic social distancing rules, executable by a processor to monitor video frames of one or more video feeds. The computer-readable instructions are further executable by the processor to classify a plurality of persons in the video frames. Additionally, the computer-readable instructions are further executable by the processor to calculate respective distances between each person of the plurality of persons and remaining persons of the plurality of persons. Additionally, the computer-readable instructions are further executable by the processor to detect mask usage of the plurality of persons. The mask usage indicating whether each person of the plurality of persons is wearing a mask. Additionally, the computer-readable instructions are further executable by the processor to measure a dwell time of the plurality of persons. The dwell time indicating a duration of time that each person of the plurality of persons has been within a proximity threshold to the remaining persons of the plurality of persons. Additionally, the computer-readable instructions are further executable by the processor to determine whether the plurality of persons are in violation of the dynamic social distancing rules based at least on the respective distances, the mask usage, and the dwell time. Additionally, the computer-readable instructions are further executable by the processor to generate an alert in response to determining that the plurality of persons are in violation of the dynamic social distancing rules.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
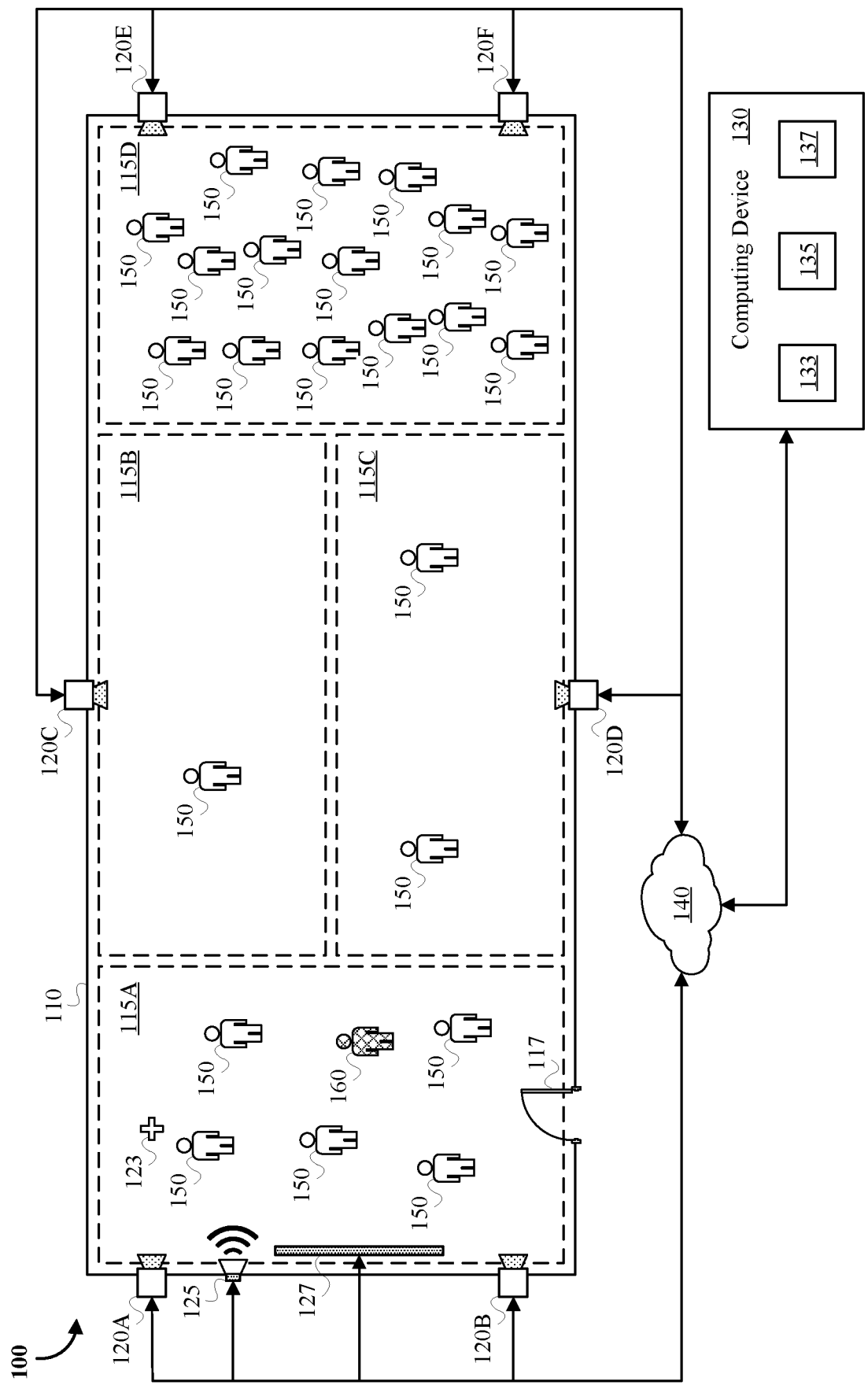
FIG. 1 is a schematic diagram of an example environment including a system for enforcing dynamic social distancing rules, in accordance with various aspects of the present disclosure.

It will be readily understood that the components of the aspects as generally described herein and illustrated in the appended figures could be arranged and designed in a wide variety of different configurations. Thus, the following more detailed description of various aspects, as represented in the figures, is not intended to limit the scope of the present disclosure, but is merely representative of various aspects. While the various aspects of the aspects are presented in drawings, the drawings are not necessarily drawn to scale unless specifically indicated.

The present solution may be embodied in other specific forms without departing from its spirit or essential characteristics. The described aspects are to be considered in all respects only as illustrative and not restrictive. The scope of the present solution is indicated by the appended claims rather than by this detailed description. All changes that come within the meaning and range of equivalency of the claims are to be embraced within their scope.

Reference throughout this specification to features, advantages, or similar language does not imply that all of the features and advantages that may be realized with the present solution should be or are in any single aspect of the present solution. Rather, language referring to the features and advantages is understood to mean that a specific feature, advantage, or characteristic described in connection with an aspect is included in at least one aspect of the present solution. Thus, discussions of the features and advantages, and similar language, throughout the specification may, but do not necessarily, refer to the same aspect.

Furthermore, the described features, advantages, and characteristics of the present solution may be combined in any suitable manner in one or more aspects. One skilled in the relevant art will recognize, in light of the description herein, that the present solution can be practiced without one or more of the specific features or advantages of a particular aspect. In other instances, additional features and advantages may be recognized in certain aspects that may not be present in all aspects of the present solution.

Reference throughout this specification to "one aspect," "an aspect," or similar language means that a particular feature, structure, or characteristic described in connection with the indicated aspect is included in at least one aspect of the present solution. Thus, the phrases "in one aspect", "in an aspect," and similar language throughout this specification may, but do not necessarily, all refer to the same aspect.

As used in this document, the singular form "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Conventional video surveillance systems may not be suitable for enforcement of dynamic social distancing rules in environments (e.g., retail store premises, office buildings, distribution centers, factories, parks, sidewalks). For example, conventional video surveillance systems may not provide for automatic detection of mask usage by one or more persons at the environments based on video feeds from cameras located at the environments. That is, conventional video surveillance systems may not be able to determine whether occupants and/or visitors appearing on the video feeds are wearing a mask (e.g., covering at least the nose and mouth of the wearer). Alternatively or additionally, conventional video surveillance systems may not be able to determine whether the one or more persons at the environments are complying with minimum distancing rules, and/or measure how long the one or more persons interact with and/or are within a proximity threshold to one another. Moreover, conventional video surveillance systems may not dynamically adjust certain thresholds and/or parameters of the dynamic social distancing rules (e.g., minimum distance between two persons) based on one or more factors (e.g., mask usage, geographic location).

Examples of the technology disclosed herein provide for multiple manners to dynamically adjust certain thresholds and/or parameters of dynamic social distancing rules. As such, a video surveillance system may determine violations of the dynamic social distancing rules based on the dynamically adjusted thresholds. Further, aspects presented herein may increase accuracy and effectiveness of enforcement of the dynamic social distancing rules over conventional video surveillance systems.

These and other features of the present disclosure are discussed in detail below with regard to FIGS. 1-5.

FIG. 1 is a diagram illustrating an example video surveillance system 100. The video surveillance system 100 may be configured to monitor one or more areas of environment 110. The environment 110 may be a retail store premise, an office building, a distribution center, a factory, a park, or a sidewalk. The present solution is not limited in this regard, and can be used in other environments. Notably, the present solution may be employed in any environment in which mask wearing and/or social distancing policies need to be enforced.

The video surveillance system 100 may be configured to monitor the environment 110, or a portion of the environment 110, and to detect one or more persons 150 (generally referred to herein as "person(s) 150") that may be located within the environment 110. Alternatively or additionally, the video surveillance system 100 may be configured to monitor one or more environments. The video surveillance system 100 may be further configured to determine whether each of the persons 150 are wearing a mask. In some aspects, the video surveillance system 100 may be configured to calculate physical distances between the persons 150. In other aspects, the video surveillance system 100 may be configured to measure a time duration (i.e., a dwell time) that the persons 150 have been interacting with or been within a proximity threshold to one another. In yet other aspects, the video surveillance system 100 may be configured to generate an alert in response to a determination that the persons 150 are in violation of the dynamic social distancing rules.

In other optional or additional aspects, the video surveillance system 100 may be configured to obtain identification information of a person of interest 160. For example, the person of interest 160 may be an employee that has been identified as having contracted an infectious disease and the identification information may comprise information obtained from an employee database. In such aspects, the video surveillance system 100 may be configured to determine the persons 150 (e.g., co-workers) that interacted with and/or where within a proximity threshold to the person of interest 160 (e.g., employee) while the person of interest 160 was at a work location. The video surveillance system 100 may be further configured to determine whether such persons 150 and the person of interest 160 complied with the dynamic social distancing rules. Notably, the present solution is not limited in this regard, and can be used in other environments.

The video surveillance system 100 may employ cameras 120A-120F (generally referred to herein as "camera(s) 120") that may be arranged to capture video from areas 115A-115D (generally referred to herein as "area(s) 115") of the environment 110. For example, the cameras 120A and 120B may capture video from the area 115A, the camera 120C may capture video from the area 115B, the camera 120D may capture video from the area 115C, and the cameras 120E and 120F may capture video from the area 115D.

Alternatively or additionally, the camera 120A may capture video from the areas 115A, 115B, and 115D, the camera 120B may capture video from the areas 115A, 115C, and 115D, the camera 120C may capture video from the areas 115B and 115C, the camera 120E may capture video from the areas 115A, 115B, and 115D, and the camera 120F may capture video from the areas 115A, 115C, and 115D. That is, each camera 120 may capture video from the areas 115 of the environment 110, and each area 115 may be monitored by the cameras 120.

In some aspects, the video surveillance system 100 may employ a different quantity of the cameras 120 as those shown in FIG. 1, as well as, the environment 110 may be subdivided into a different number of areas as those shown in FIG. 1, without departing from the scope described herein. In other aspects, the environment 110 may comprise multiple areas that may not be located within the same environment, such as open space(s), front door(s) and back door(s).

In other optional or additional aspects, the environment 110 may comprise an access control point 117. The access control point 117 may comprise any device and/or system that may provide access control functionality. That is, the access control point 117 may refer to a device and/or system that may require the persons 150 to present identification information in order to obtain permission to enter and/or exit an area, such as, but not limited to, an access-controlled door, a turnstile, an elevator, and an identification checkpoint. In some aspects, the access control point 117 may comprise devices for acquiring identification information from the persons 150 attempting to obtain access, such as card readers, key fob readers, biometric readers, and the like. The identification information may be provided to or accessible to the video surveillance system 100 for identifying the persons 150, 160 in the environment 110. The video surveillance system 100 may be configured to deny access to the environment 110 to the persons 150 attempting to enter the environment 110 via the access control point 117 while in violation of the dynamic social distancing rules.

The cameras 120 may be digital video cameras such as security cameras. The cameras 120 may provide a constant video feed of one or more of the areas 115. Image quality (e.g., resolution, frame rate) of the one or more video feeds provided by the cameras 120 may be sufficient to determine whether the persons 150 appearing in the one or more video feeds are wearing a mask and/or to determine a physical distance between the persons 150.

The cameras 120 may be calibrated with a camera enrollment process of the video surveillance system 100 that uses reference object(s) of a known physical size and a known distance from the respective cameras 120. For example, the camera enrollment process may use a marker 123 to calibrate camera 120A. In some aspects, the camera enrollment process may comprise an image processing algorithm that may provide ratios for converting pixel distances of video frames to physical distances in the environment 110. That is, the video surveillance system 100 may utilize these ratios for determining physical distances between objects (e.g., the persons 150) based at least on pixel distances between the objects appearing in the video frames. For example, the video surveillance system 100 may utilize these ratios to determine whether social distance constraints are being met. Alternatively or additionally, the ratios may be utilized to determine physical sizes of objects appearing in the video frames. For example, the video surveillance system 100 may utilize these ratios to determine a height and/or width of an object appearing in the video frames.

In some aspects, the marker 123 may comprise one or more markings or symbols placed on the ground of the area 115 at respective locations having known distances from one another. For example, the marker 123 may comprise one or more known social distancing symbols on the ground such as circles, squares, "X" marks, or other known indicia that are spaced by a known social distancing constraint.

The cameras 120 may generally be oriented in a default direction to capture a particular portion of the area 115 where activity may be expected, but one or more of the cameras 120 may be mounted on a gimbal that may allow for rotation and/or panning of the respective camera 120. For example, the video surveillance system 100 may move the camera 120 to maintain a field of view of the camera 120 on the persons 150. In some aspects, the video surveillance system 100 may allow for manual control of the rotation and/or panning of the camera 120 (e.g., by security personnel).

The video surveillance system 100 may comprise a speaker 125 configured to generate an alert that may be audible by the persons 150 located within the environment 110 (e.g., one or more areas 115). In some aspects, the speaker 125 may comprise, or be part of, a public announcement system. The video surveillance system 100 may comprise a display 127 such as a digital signage. The display 127 may be configured to display textual, graphical, and/or video messages generated by the video surveillance system 100. For example, the display 127 may display alerts generated by the video surveillance system 100 indicating that the persons 150 in one or more areas 115 are in violation of the dynamic social distancing rules. In some aspects, the alerts may indicate that the persons 150 are denied access to one or more areas 115. In some aspects, the video surveillance system 100 may generate a combination of audio and/or visual alerts indicating a violation of the dynamic social distancing rules. Alternatively or additionally, the alerts may indicate remediation steps that may be taken by the persons 150 to comply with the dynamic social distancing rules.

The cameras 120, the speaker 125, and the display 127 may be communicatively coupled with a network 140, such as the Internet. Other networks may also or alternatively be used, including but not limited to private intranets, corporate networks, local area networks ("LAN"), metropolitan area networks ("MAN"), wireless networks, personal networks ("PAN"), and the like.

In some aspects, the video feeds captured by the cameras 120 may be transmitted via the network 140 to a computing device 130, which may implement all or a portion of the functionality described herein. That is, the computing device 130 may be communicatively coupled with the network 140, and, as such, may indirectly receive one or more video feeds from the cameras 120 via the network 140. Alternatively or additionally, the computing device 130 may be communicatively coupled directly (e.g., hard-wired) with the cameras 120. For example, the computing device 130 may receive the one or more video feeds directly from the cameras 120.

The computing device 130 may be any type of known computer, server, or data processing device. For example, the computing device 130 may be any mobile or fixed computer device including but not limited to a computer server, a desktop or laptop or tablet computer, a cellular telephone, a personal digital assistant ("PDA"), a handheld device, any other computer device having wired and/or wireless connection capability with one or more other devices, or any other type of computerized device capable of processing video data captured by the cameras 120. In some aspects, the computing device 130 may be a cloud-based or shared computing structure accessible through the network 140. The computing device 130 may be located in a location remote from the environment 110, or may be integrated as part of the video surveillance system 100.

The computing device 130 may comprise a processor 133 which may be configured to execute or implement software, hardware, and/or firmware modules that perform any functionality described herein. For example, the processor 133 may be configured to execute or implement software, hardware, and/or firmware modules that perform any functionality described herein with reference to a social distancing component 137 or any other component/system/device described herein.

The processor 133 may be a micro-controller, an application-specific integrated circuit ("ASIC"), a digital signal processor ("DSP"), or a field-programmable gate array ("FPGA"), and/or may comprise a single or multiple set of processors or multi-core processors. Moreover, the processor 133 may be implemented as an integrated processing system and/or a distributed processing system. The computing device 130 may further comprise a memory 135, such as for storing local versions of applications being executed by the processor 133, or related instructions, parameters, and the like.

The memory 135 may include a type of non-transitory memory usable by a computer, such as random access memory ("RAM"), read only memory ("ROM"), tapes, magnetic discs, optical discs, solid state drives ("SSDs"), volatile memory, non-volatile memory, and any combination thereof. Alternatively or additionally, the processor 133 and the memory 135 may comprise and execute an operating system executing on the processor 133, one or more applications, display drivers, etc., and/or other components of the computing device 130.

The computing device 130 may comprise the social distancing component 137 configured to monitor video frames of one or more video feeds, to classify a plurality of persons 150 in the video frames, to calculate respective distances between each person 150 of the plurality of persons 150 and remaining persons 150 of the plurality of persons 150, to detect mask usage of the plurality of persons 150, to measure a dwell time of the plurality of persons 150, to determine whether one or more persons 150 of the plurality of persons 150 are in violation of the dynamic social distancing rules, and to generate an alert in response to determining that the plurality of persons 150 are in violation of the dynamic social distancing rules.

The dynamic social distancing rules may indicate one or more characteristics that need to be met in order to comply with the dynamic social distancing rules. In some aspects, the dynamic social distancing rules may comprise a mask wearing constraint that may indicate the parts of the face of the person 150 (e.g., nose, mouth) that need to be covered by a mask in order to determine that the person 150 is wearing a mask. Alternatively or additionally, the mask wearing constraint may indicate whether the use of a mask is required in one or more areas 115 in order to comply with the dynamic social distancing rules. For example, the mask wearing constraint may designate one area 115 as requiring mask use (e.g., cafeteria, hallway) for compliance with the dynamic social distancing rules and may designate another area 115 as not requiring (e.g., optional) mask use (e.g., private office, cafeteria, park, sidewalk).

In other optional or additional aspects, the dynamic social distancing rules may comprise a distance threshold that may indicate a minimum distance between two persons 150 that is required in order to comply with the dynamic social distancing rules. In other optional or additional aspects, the dynamic social distancing rules may comprise a dwell time threshold that may indicate a maximum duration of time that two or more persons 150 may interact with and/or be within a proximity threshold to one another.

In other optional or additional aspects, the dynamic social distancing rules may comprise one or more preliminary thresholds corresponding to a constraint of the dynamic social distancing rules. The preliminary thresholds may be configured to indicate that a condition is close to triggering a violation of the dynamic social distancing rules. For example, a preliminary dwell time threshold may be configured to indicate that a current dwell time of the persons 150 (e.g., 14 minutes) is close to the dwell time threshold (e.g., 15 minutes), and, as such, close to causing a violation of the dynamic social distancing rules. In another example, a preliminary distance threshold may be configured to indicate that a distance between two of persons 150 (e.g., 6.5 feet) is close to the distance threshold (e.g., 6 feet), and, as such, close to triggering a violation of the dynamic social distancing rules.

In other optional or additional aspects, the constraints comprised by the dynamic social distancing rules may dynamically change based on one or more factors, such as mask usage, geographic location, and the like. For example, a first geographic location and/or region (e.g., office) may require a first minimum distance (e.g., six feet), and a second geographic location and/or region (e.g., park) may require a second minimum distance (e.g., three feet). In another example, a distance threshold may change according to mask usage of the persons 150. In such an example, a first plurality of persons 150 may be required to keep a first minimum distance (e.g., three feet) if or when each person 150 in the first plurality of persons 150 is wearing a mask, and a second plurality of persons 150 may be required to keep a second minimum distance (e.g., six feet) if or when at least one person in the second plurality of persons 150 is not wearing a mask.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system is shown in FIG. 2.

Figure 2:
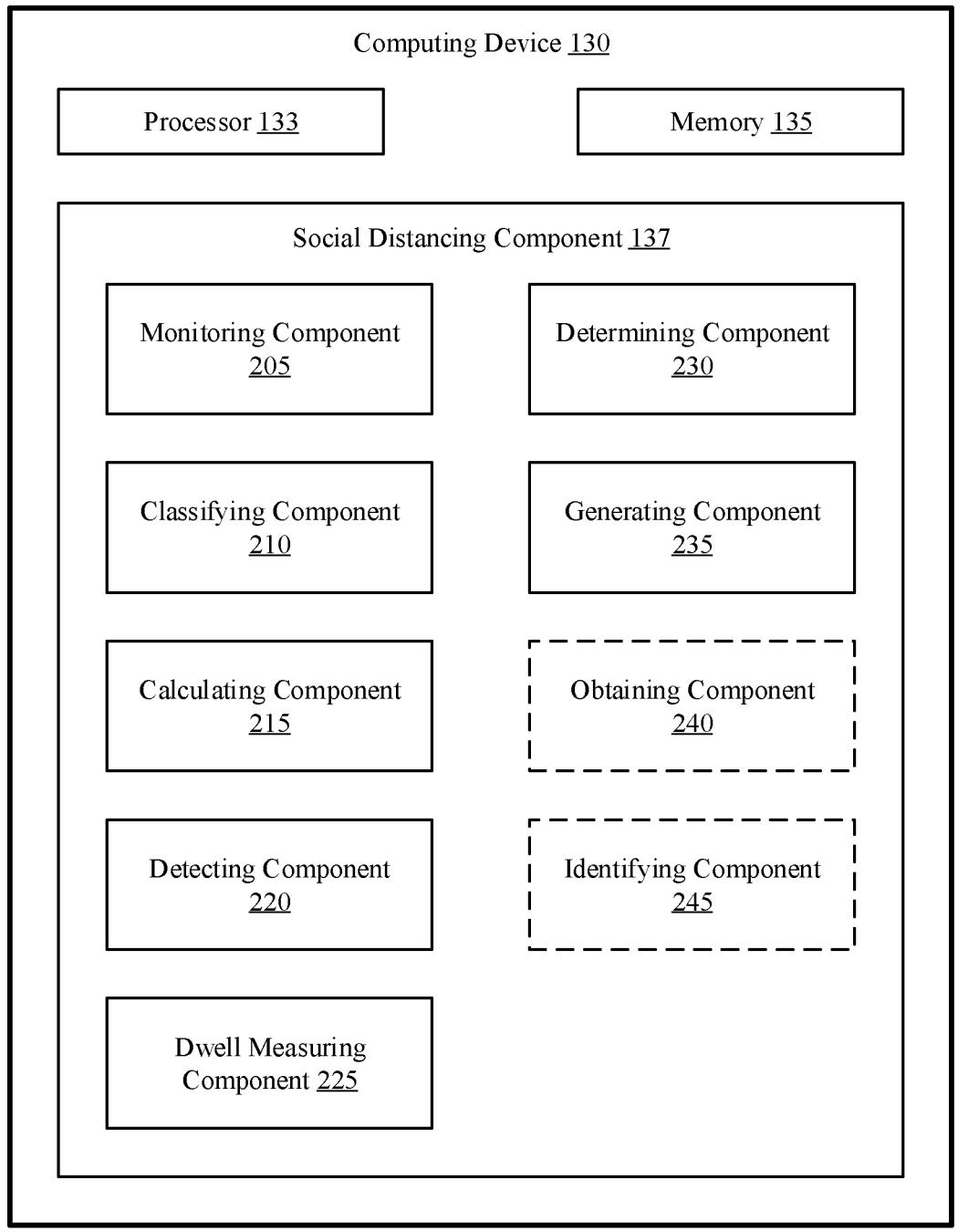
FIG. 2 is a block diagram illustrating an example computing device, in accordance with various aspects of the present disclosure.

FIG. 2 is a block diagram of an example computing device 130 for enforcing dynamic social distancing rules. The computing device 130 depicted in FIG. 2 is similar in many respects to the computing device 130 described above with reference to FIG. 1, and may include additional features not mentioned above. In some aspects, the computing device 130 may comprise the processor 133 configured to execute or implement software, hardware, and/or firmware modules that perform any functionality described herein (e.g., the social distancing component 137), the memory 135 configured to store instructions executed the processor 133, and the social distancing component 137 configured to enforce dynamic thresholds of social distancing rules.

In some aspects, the computing device 130 may be configured to perform one or more operations described herein in connection with FIG. 1. Alternatively or additionally, the computing device 130 may be configured to perform one or more processes described herein, such as method 300 of FIGS. 3-5. In other aspects, the computing device 130 may include one or more components of the computing device 130 described above in connection with FIG. 1.

In some aspects, the social distancing component 137 may include a set of components, such as a monitoring component 205 configured to monitor video frames of one or more video feeds, an classifying component 210 configured to classifying one or more persons 150 in the video frames, a calculating component 215 configured to calculate physical distances between the one or more persons 150, a detecting component 220 configured to detect whether the one or more persons 150 are wearing a mask, a dwell measuring component 225 configured to measure a time duration (i.e., a dwell time) that the one or more persons 150 have been interacting with or been within a proximity threshold to one another, a determining component 230 configured to whether the one or more persons 150 are in violation of the dynamic social distancing rules, and a generating component 235 configured to generate an alert in response to determining that the one or more persons 150 are in violation of the dynamic social distancing rules. Optionally, the social distancing component 137 may further include an obtaining component 240 configured to obtain identification information of a person of interest 160, and an identifying component 245 configured to identify a first person of the plurality of persons 150 as the person of interest 160.

In other aspects, one or more components of the set of components may include or may be implemented within a controller/processor (e.g., the processor 133), a memory (e.g., the memory 135), or a combination thereof, of the computing device 130 described in FIGS. 1-2. Alternatively or additionally, one or more components of the set of components may be implemented at least in part as software stored in a memory, such as the memory 135. For example, a component (or a portion of a component) may be implemented as instructions or code stored in a non-transitory computer-readable medium and executable by a controller or a processor to perform the functions or operations of the component.

Figure 3:
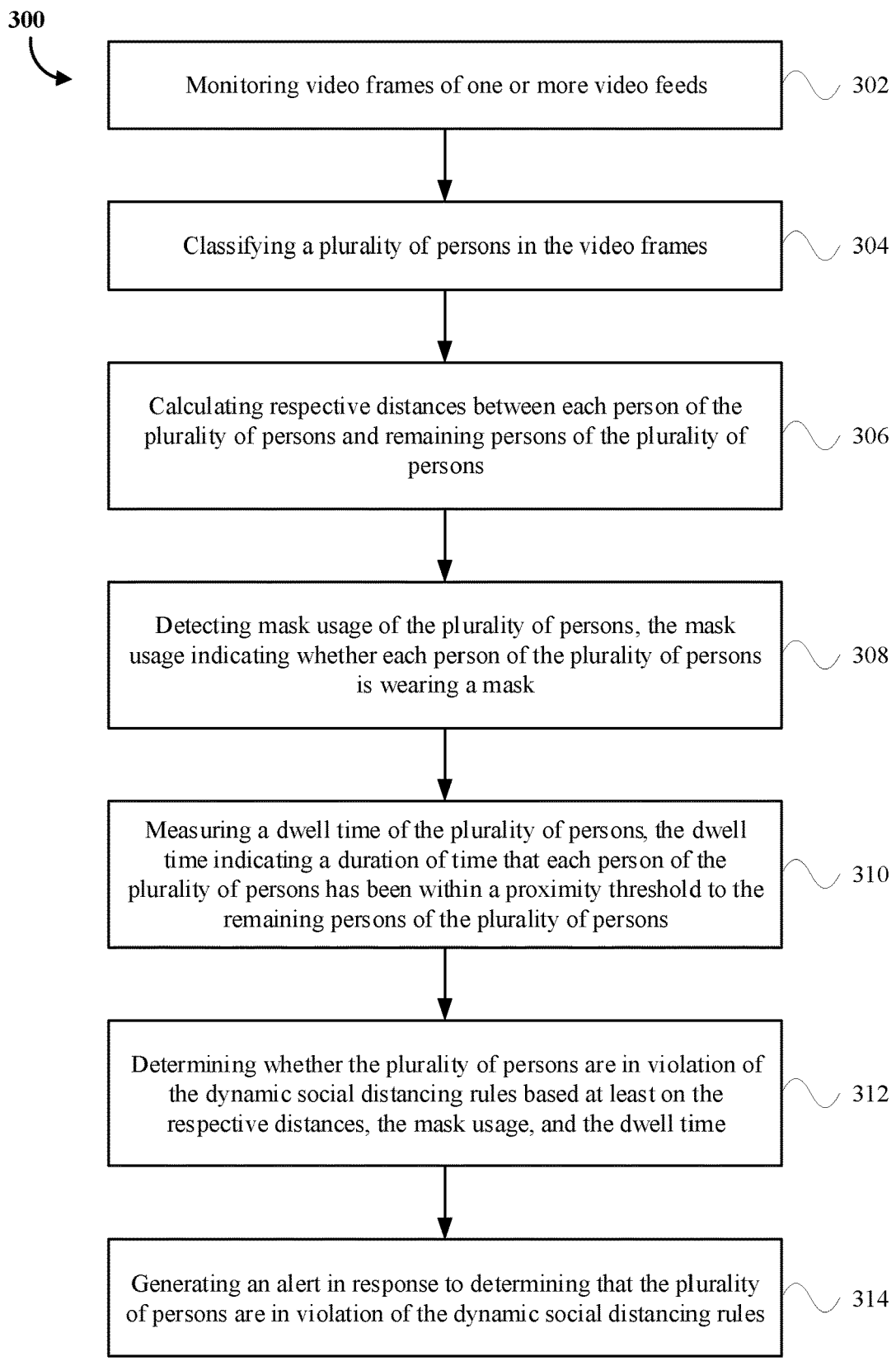
FIG. 3 is a flowchart of a method of enforcing dynamic social distancing rules to be performed by a computing device, in accordance with various aspects of the present disclosure.
Figure 4:
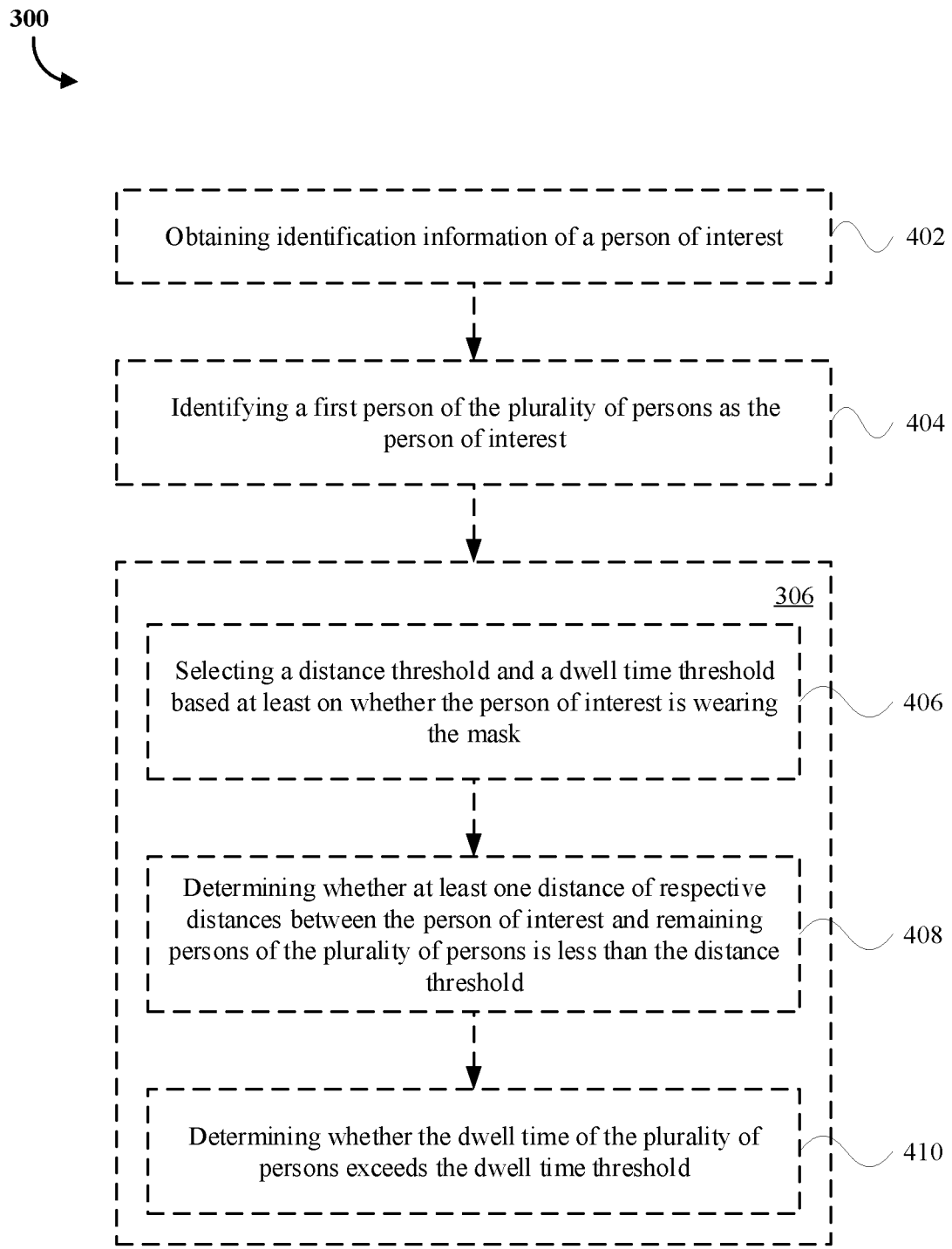
FIG. 4 is a flowchart of first additional or optional steps of the method of enforcing dynamic social distancing rules to be performed by the computing device, in accordance with various aspects of the present disclosure.
Figure 5:
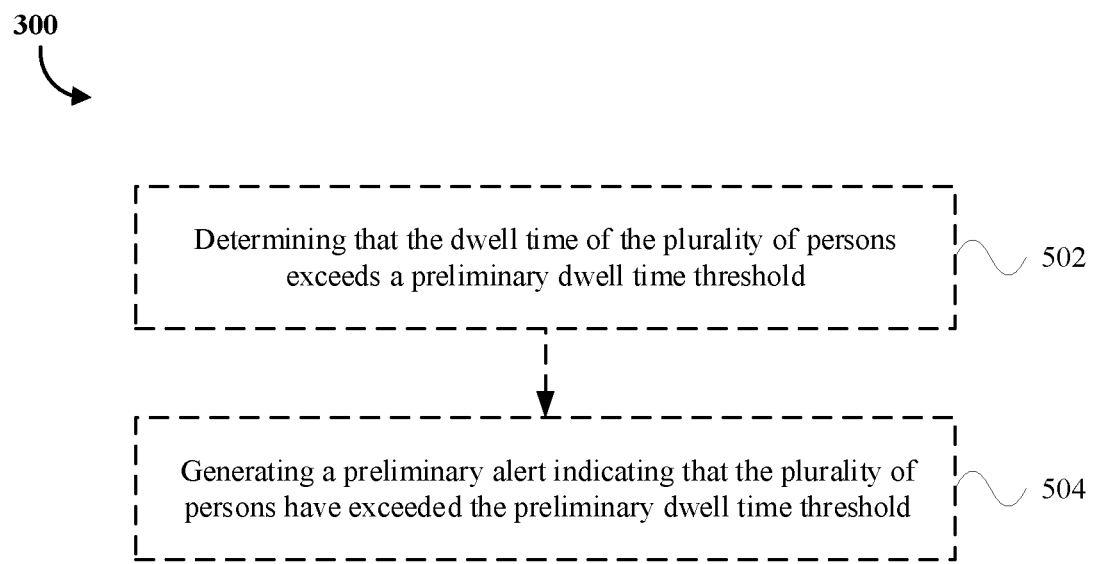
FIG. 5 is a flowchart of second additional or optional steps of the method of enforcing dynamic social distancing rules to be performed by the computing device, in accordance with various aspects of the present disclosure.

Referring to FIGS. 3-5, in operation, the computing device 130 may perform a method 300 of enforcing dynamic social distancing rules. The method 300 may be performed by the computing device 130 (which may include the memory 135 and which may be the entire computing device 130 and/or one or more components of the computing device 130, such as the social distancing component 137, the processor 133, and/or the memory 135.) The method 300 may be performed by the social distancing component 137 in communication with the cameras 120.

At block 302, the method 300 includes monitoring video frames of one or more video feeds. For example, in an aspect, the computing device 130, the processor 133, the memory 135, the social distancing component 137, and/or the monitoring component 205 may be configured to or may comprise means for monitoring the video frames of the one or more video feeds.

For example, the monitoring at block 302 may include monitoring the video frames of the one or more video feeds captured by the cameras 120. That is, the one or more video feeds from the cameras 120 may be passed to the computing device 130 through the network 140 for processing. The cameras 120 may be monitoring the areas 115 of the environment 110. In some aspects, the one or more video feeds may include video frame information that may permit time-stamp identification of the status of the areas 115 at a particular time. In other optional or additional aspects, the monitoring at block 302 may include extracting video frames from the one or more video feeds in order to determine compliance with the dynamic social distancing rules, as described herein.

Further, for example, the monitoring at block 302 may be performed to gather video frames from the one or more video feeds that may be analyzed in order to determine violations of the dynamic social distancing rules by the persons 150 located within the environment 110.

At block 304, the method 300 includes classifying a plurality of persons in the video frames. For example, in an aspect, the computing device 130, the processor 133, the memory 135, the social distancing component 137, and/or the classifying component 210 may be configured to or may comprise means for classifying the plurality of persons 150 in the video frames.

For example, the classifying at block 304 may include analyzing the extracted video frames to detect objects that appear in the video frames. In some aspects, the classifying at block 304 may include classifying the objects that appear in the video frames and determining whether the objects constitute the plurality of persons 150.

In other optional or additional aspects, the classifying at block 304 may include accessing a database or other data store of images and using image processing algorithms, machine learning classifiers, and the like on the video frames to establish which objects in the video frames may likely represent the plurality of persons 150. For example, the classifying at block 304 may include comparing the video frames with stock images of people to determine whether the objects that appear in the video frames constitute the plurality of persons 150.

In other optional or additional aspects, the classifying at block 304 may include obtaining base images of the areas 115 in which no persons 150 appear. That is, the base images of the areas 115 may show an area 115 with no people present. In such an aspect, the classifying at block 304 may include comparing the video frames of the one or more video feeds with the base images having no people present to detect additional objects in the video frames and determining whether the additional objects may represent the plurality of persons 150.

In other optional or additional aspects, the classifying at block 304 may include placing bounding boxes around objects identified in the video frames and discarding bounding boxes whose dimensions do not meet certain thresholds as likely non-human objects. For example, bounding boxes that identify objects having dimensions smaller or larger than a conventional human size (e.g., a footprint of 2 feet by 2 feet or less, a height of over 7 feet, or a width of over 4 feet) may be discarded. Alternatively or additionally, bounding boxes whose positions change rapidly over subsequent video frames may be discarded. As such, non-human objects, such as birds, dogs, handcarts, suitcases, or cars may not be classified as the persons 150.

Further, for example, the classifying at block 304 may be performed to detect and classify human objects in the video frames as the plurality of persons 150 and to discard non-human objects.

At block 306, the method 300 includes calculating respective distances between each person of the plurality of persons and remaining persons of the plurality of persons. For example, in an aspect, the computing device 130, the processor 133, the memory 135, the social distancing component 137, and/or the calculating component 215 may be configured to or may comprise means for calculating the respective distances between each person 150 of the plurality of persons 150 and the remaining persons 150 of the plurality of persons 150.

For example, the calculating at block 306 may include calculating a distance between each person 150 of the plurality of persons 150 classified in the video frames and every other person 150 remaining in the plurality of persons 150. In some aspects, the calculating at block 306 may include identifying the bounds of each person 150 in a video frame using, for example, overlaying box bounding technology onto the video frames of the one or more video feeds. Alternatively or additionally, tracking algorithms may be used to ensure that occluded persons 150 are considered and are not lost across video frames. In other optional or additional aspects, the calculating at block 306 may include calculating the distance between each person 150 and their nearest neighboring person 150 based on the information from the overlaid bounding boxes. For example, a distance calculation algorithm may calculate Euclidian distances between the outer bounds of the bounding boxes corresponding to each person 150 and the remaining persons 150, and may convert the Euclidian distanced into physical distance measurements.

In other optional or additional aspects, the distance calculation algorithm may utilize a size of a bounding box of a person 150 to contribute to the distance calculation. In some aspects, a camera angle of the camera 120 may not be exactly top down or eye level. In such aspects, the size of the bounding box may be used as an additional feature to calculate the distances. For example, the distance calculation algorithm may use a 3-dimensional model and the size of the bounding box to provide a Z-axis component (e.g., depth) of the position coordinates of the person 150. The X-axis and the Y-axis components of the position coordinates may be transformed from Euclidian distances to physical distances using information stored during the camera enrollment process.

In other optional or additional aspects, the distance calculation algorithm may include Artificial Intelligence ("AI") or machine learning based algorithms. For example, the distance calculation algorithm may be trained by a machine learning classifier trained on labeled videos or images to classify and interpret video frames from a video feed in order to determine whether there are persons 150 present in an area 115, and to calculate the distances between respective persons 150. That is, the distance calculation algorithm may utilize supervised learning to classify video frames and to determine whether persons 150 in area 115 are complying with the dynamic social distancing rules. In some aspects, the distance calculation algorithm may be trained using reinforcement learning with a goal to correctly classify persons 150 and their relative positions to one another in a video frame. For example, the distance calculation algorithm may determine that the dynamic social distancing rules have been violated if or when the video frames closely match the training videos of persons 150 that are in violation of the dynamic social distancing rules.

Further, for example, the calculating at block 306 may be performed to automatically determine the physical distances between the persons 150 in the environment 110. Such determinations may allow the video surveillance system 100 to automatically determine whether the persons 150 are in violation of a distance threshold of the dynamic social distancing rules without the need for time and labor intensive manual processes. Thus, aspects presented herein may increase accuracy and effectiveness of the enforcement of the dynamic social distancing rules over conventional video surveillance systems.

In an optional aspect, the calculating at block 306 comprises determining, based at least on a first size of a first bounding box around a first person 150 of the plurality of persons 150, a first depth component of a first coordinate set of the first person 150. In this optional aspect, the calculating at block 306 further comprises determining, based at least on a second size of a second bounding box around a second person 150 of the plurality of persons 150, a second depth component of a second coordinate set of the second person 150. In this optional aspect, the calculating at block 306 further comprises calculating a physical distance between the first person 150 and the second person 150 based at least on the first depth component and the second depth component.

For example, the calculating at block 306 may include determining corresponding depth (e.g., Z-axis) components of the bounding boxes of the two persons 150 in the distance calculation. Further, for example, the calculating at block 306 may be performed to account for a distortion introduced by the camera angle into the distance calculations. Thus, aspects presented herein may increase accuracy of distance calculations by the video surveillance system 100.

At block 308, the method 300 includes detecting mask usage of the plurality of persons, the mask usage indicating whether each person of the plurality of persons is wearing a mask. For example, in an aspect, the computing device 130, the processor 133, the memory 135, the social distancing component 137, and/or the detecting component 220 may be configured to or may comprise means for detecting the mask usage of the plurality of persons 150, the mask usage indicating whether each person 150 of the plurality of persons 150 is wearing the mask.

For example, the detecting at block 308 may include determining whether or not each person 150 of the plurality of persons 150 is wearing a mask. In some aspects, the detecting at block 308 may include determining whether each person 150 of the plurality of persons 150 is wearing a mask based at least on one or more respective facial features of the plurality of persons 150. That is, the detecting at block 308 may include determining whether the facial features of each person 150 of the plurality of persons 150 indicate that the person is wearing a mask in compliance with the mask wearing constraint of the dynamic social distancing rules. For example, the mask wearing constraint may indicate that the persons 150 are to wear a mask that covers the nose and the mouth. In such an example, if or when the facial features corresponding to the person 150 do not comprise nose and mouth facial features, the detecting at block 308 may include determining that the person 150 is wearing a mask. That is, if or when both of a person's nose and mouth are hidden from view, the person 150 is likely to be wearing a mask in compliance with the mask wearing constraint of the dynamic social distancing rules. Alternatively or additionally, if or when the respective facial features corresponding to another person 150 comprise nose or mouth facial features, the detecting at block 308 may include determining that the person 150 is wearing a mask 150 incorrectly. That is, if or when a person's nose or mouth are visible, the person 150 is unlikely to be wearing a mask in compliance with the mask wearing constraint of the dynamic social distancing rules.

Further, for example, the detecting at block 308 may be performed to automatically determine whether the persons 150 in the environment 110 are wearing a mask. Such a determination may allow the video surveillance system 100 to automatically enforce compliance of the dynamic social distancing rules without the need for time and labor intensive manual processes. Thus, aspects presented herein may increase accuracy and effectiveness of the enforcement of the dynamic social distancing rules over conventional video surveillance systems.

In an optional aspect, the detecting at block 308 comprises providing the video frames to a facial feature detection algorithm, and determining whether each person 150 of the plurality of persons 150 is wearing the mask based at least on the respective facial features of that person 150. The facial feature detection algorithm may be configured to extract respective facial features of the plurality of persons 150.

For example, the facial feature detection algorithm may comprise a machine learning classifier having been trained to extract facial features (e.g., eyes, noses, mouths, ears) from video frames in which one or more persons 150 appear. Alternatively or additionally, the facial feature detection algorithm may compare properties of base images of facial features with the properties of the video frames, such as color (e.g., hue, lightness, or saturation), object shape (e.g., shape of face), object size (e.g., of person 150), and/or other conventional image comparison attributes. For example, the base images may comprise a database of photos of persons 150 that work in a building and/or company. In some aspects, the detecting at block 308 comprises providing identification information corresponding to the persons 150 appearing in the video frames that have been provided to the facial feature detection algorithm. For example, the identification information may comprise identifying information such as name, address, office number, employer, access card identification number, key fob identification number, biometric information, and the like.

At block 310, the method 300 includes measuring a dwell time of the plurality of persons, the dwell time indicating a duration of time that each person of the plurality of persons has been within a proximity threshold to the remaining persons of the plurality of persons. For example, in an aspect, the computing device 130, the processor 133, the memory 135, the social distancing component 137, and/or the dwell measuring component 225 may be configured to or may comprise means for measuring a dwell time of the plurality of persons 150, the dwell time indicating the duration of time that each person 150 of the plurality of persons 150 has been within a proximity threshold to the remaining persons 150 of the plurality of persons 150.

For example, the measuring at block 310 may include comparing video frames when the plurality of persons 150 entered an area 115 with subsequent video frames to determine how long the plurality of persons 150 remained interacting with and/or being within a proximity threshold to one another.

Further, for example, the measuring at block 310 may be performed to automatically determine dwell times between the persons in the environment 110. Such determinations may allow the video surveillance system 100 to automatically determine whether the persons 150 are in violation of a dwell time threshold of the dynamic social distancing rules without the need for time and labor intensive manual processes. Thus, aspects presented herein may increase accuracy and effectiveness of the enforcement of dynamic social distancing rules over conventional video surveillance systems.

At block 312, the method 300 includes determining whether the plurality of persons are in violation of the dynamic social distancing rules based at least on the respective distances, the mask usage, and the dwell time. For example, in an aspect, the computing device 130, the processor 133, the memory 135, the social distancing component 137, and/or the determining component 230 may be configured to or may comprise means for determining whether the plurality of persons 150 are in violation of the dynamic social distancing rules based at least on the respective distances, the mask usage, and the dwell time.

For example, the determining at block 312 may include selecting a distance threshold based at least on the mask usage of the plurality of persons. That is, the determining at block 312 may include selecting a first distance threshold that may indicate a first minimum distance between two persons 150 if or when the mask usage of the plurality of persons 150 indicates that the plurality of persons 150 are wearing a mask. For example, if or when the plurality of persons 150 are wearing a mask, the determining at block 312 may include selecting three feet as the distance threshold (i.e., a minimum distance required for compliance with the dynamic social distancing rules.) Alternatively or additionally, the determining at block 312 may include selecting a second distance threshold that may indicate a second minimum distance between two persons 150 if or when the mask usage of the plurality of persons 150 indicates that at least one person of the plurality of persons 150 is not wearing a mask. For example, if or when at least one person of the plurality of persons 150 is not wearing a mask, the determining at block 312 may include selecting six feet as the distance threshold.

In some aspects, the determining at block 312 may include selecting a dwell time threshold based at least on the mask usage of the plurality of persons. That is, the determining at block 312 may include selecting a first dwell time threshold that may indicate a first maximum duration of time that two or more persons 150 may interact with and/or be within a proximity threshold to one another if or when the mask usage of the plurality of persons 150 indicates that the plurality of persons 150 are wearing a mask. For example, if or when the plurality of persons 150 are wearing a mask, the determining at block 312 may include selecting 20 minutes as the dwell time threshold. Alternatively or additionally, the determining at block 312 may include selecting a second dwell time threshold that may indicate a second maximum duration of time that two or more persons 150 may interact with and/or be within a proximity threshold to one another if or when the mask usage of the plurality of persons 150 indicates that at least one person of the plurality of persons 150 is not wearing a mask. For example, if or when at least one person of the plurality of persons 150 is not wearing a mask, the determining at block 312 may include selecting 40 minutes as the dwell time threshold.

In other optional or additional aspects, the determining at block 312 may include selecting a distance threshold and/or a dwell time threshold based at least on a geographic location and/or region. For example, a first geographic location and/or region (e.g., office) may require a first distance threshold (e.g., six feet), and a second geographic location and/or region (e.g., park) may require a second distance threshold (e.g., three feet).

In other optional or additional aspects, the determining at block 312 may include determining whether at least one distance of the respective distances is less than the distance threshold. For example, the determining at block 312 may include comparing the respective distances between each person 150 of the plurality of persons 150 and the remaining persons 150 of the plurality of persons 150, calculated at block 306, with the selected distance threshold. That is, if or when the respective distances exceed the selected distance threshold, the determining at block 312 may include determining that the plurality of persons 150 is not in violation of the dynamic social distancing rules. Alternatively or additionally, if or when at least one of the respective distances does not exceed the selected distance threshold, the determining at block 312 may include determining that the plurality of persons 150 are in violation of the dynamic social distancing rules.

In other optional or additional aspects, the determining at block 312 may include determining whether the dwell time of the plurality of persons 150 exceeds the dwell time threshold. For example, the determining at block 312 may include comparing the dwell time of the plurality of persons 150 with the selected dwell time threshold. That is, if or when the dwell time of the plurality of persons 150 exceeds the dwell time threshold, the determining at block 312 may include determining that the plurality of persons 150 is in violation of the dynamic social distancing rules. Alternatively or additionally, if or when the dwell time of the plurality of persons 150 does not exceed the dwell time threshold, the determining at block 312 may include determining that the plurality of persons 150 is not in violation of the dynamic social distancing rules.

Further, for example, the determining at block 312 may be performed to automatically determine whether the persons in the environment 110 are in violation of the dynamic social distancing rules. Such determinations may allow the video surveillance system 100 to automatically enforce the dynamic social distancing rules without the need for time and labor intensive manual processes. Thus, aspects presented herein may increase accuracy and effectiveness of the enforcement of dynamic social distancing rules over conventional video surveillance systems.

At block 314, the method 300 includes generating an alert in response to determining that the plurality of persons are in violation of the dynamic social distancing rules. For example, in an aspect, the computing device 130, the processor 133, the memory 135, the social distancing component 137, and/or the generating component 235 may be configured to or may comprise means for generating an alert in response to determining that the plurality of persons 150 are in violation of the dynamic social distancing rules.

For example, the generating at block 314 may include generating, with the speaker 125, an audible alarm (e.g., a buzzer sound) and/or an audio message that may be audible by the persons 150 that are in violation of the dynamic social distancing rules. That is, the alarm from the speaker 125 may be audible within the area 115 comprising the persons 150 that are in violation of the dynamic social distancing rules.

In some aspects, the generating at block 314 may include generating, with the display 127, textual, graphical, and/or video messages that may be visible by the persons 150 that are in violation of the dynamic social distancing rules. That is, the displayed alert message may be visible within the area 115 comprising the persons 150 that are in violation of the dynamic social distancing rules. Alternatively or additionally, the displayed alert messages may indicate remediation steps that may be taken by the persons 150 to comply with the dynamic social distancing rules.

In other optional or additional aspects, the generating at block 314 may include transmitting a notification indicating that a dynamic social distancing rule violation has been determined. For example, the generating at block 314 may include transmitting a message (e.g., email, short message service ("SMS"), automated voice call) to one or more recipients comprising an indication that the persons 150 are in violation of the dynamic social distancing rules. In some aspects, the notification may be transmitted to a third-party local to the environment 110, such as security personnel, building management personnel, and the like. Alternatively or additionally, the notification may be transmitted to a third-party remote to the environment 110, such as law enforcement, civil health authorities, and the like. In other optional or additional aspects, the notification may be transmitted to one or more persons associated with the area 115 comprising the persons 150 that are in violation of the dynamic social distancing rules. For example, if or when the environment 110 comprises an office building, the notification may be transmitted to personnel assigned to work in the area 115 comprising the persons 150 that are in violation of the dynamic social distancing rules.

Further, for example, the generating at block 314 may be performed to notify the appropriate persons and/or personnel of the dynamic social distancing rule violations determined by the video surveillance system 100. As such, the video surveillance system 100 may permit the automatic enforcement of the dynamic social distancing rules. Thus, aspects presented herein may increase accuracy and effectiveness of the enforcement of dynamic social distancing rules over conventional video surveillance systems.

In an optional aspect, the generating at block 314 comprises providing a video clip of the video frames comprising the plurality of persons 150 that are in violation of the dynamic social distancing rules.

For example, the message displayed by the display 127 may comprise the video clip of the video frames comprising the persons 150 that are in violation of the dynamic social distancing rules. Alternatively or additionally, the transmitted message (e.g., email, SMS, automated voice call) may comprise the video clip of the video frames comprising the persons 150 that are in violation of the dynamic social distancing rules. Further, for example, the generating at block 314 may be performed to assist in the identification of the persons 150 that are in violation of the dynamic social distancing rules.

Referring to FIG. 4, in an optional or additional aspect that may be combined with any other aspect, in block 402, the method 300 may include obtaining identification information of a person of interest. For example, in an aspect, the computing device 130, the processor 133, the memory 135, the social distancing component 137, and/or the obtaining component 240 may be configured to or may comprise means for obtaining the identification information of the person of interest 160.

For example, the obtaining at block 402 may include obtaining the identification information of the person of interest 160, such as at least one image of the person of interest 160. Alternatively or additionally, the identification information may comprise a database record comprising information with which a person 150, 160 may be identified, such as facial features. In some aspects, the identification information may comprise other identifying information such as name, address, office number, employer, access card identification number, key fob identification number, biometric information, and the like.

Further, for example, the obtaining at block 402 may be performed to allow for identification of the person of interest 160 from the one or more persons 150 detected in the video frames of the one or more video feeds.

In this optional or additional aspect, at block 404, the method 300 may include identifying a first person of the plurality of persons as the person of interest. For example, in an aspect, the computing device 130, the processor 133, the memory 135, the social distancing component 137, and/or the identifying component 245 may be configured to or may comprise means for identifying a first person 150 of the plurality of persons 150 as the person of interest 160.

For example, the identifying at block 404 may include comparing the at least one image of the person of interest 160 with the video frames in which the persons 150 appear in order to determine whether the person of interest 160 appears in the video frames. In some aspects, the identifying at block 404 may include using facial recognition techniques to identify the person of interest 160. Alternatively or additionally, the identifying at block 404 may utilize a facial recognition algorithm to compare facial features of the persons 150 that appear in the video frames with the identifying information of the person of interest 160.

In other optional or additional aspects, the identifying at block 404 may include identifying the first person as the person of interest 160 according to the identification information provided at block 402.

Further, for example, the identifying at block 404 may be performed to determine whether the person of interest 160 attended the environment 110. Such determinations may allow the video surveillance system 100 to identify the persons 150 that interacted with and/or been within a proximity threshold to the person of interest 160, and whether those persons 150 complied with the dynamic social distancing rules without the need for time and labor intensive manual processes. Thus, aspects presented herein may increase accuracy and effectiveness of enforcement of dynamic social distancing rules over conventional video surveillance systems.

In this optional or additional aspect, the determining at block 312 of whether the plurality of persons are in violation of the dynamic social distancing rules comprises selecting a distance threshold and a dwell time threshold based at least on whether the person of interest is wearing the mask at block 406, determining whether at least one distance of respective distances between the person of interest and remaining persons of the plurality of persons is less than the distance threshold at block 408, and determining whether the dwell time of the plurality of persons exceeds the dwell time threshold at block 410.

For example, in an aspect, the computing device 130, the processor 133, the memory 135, the social distancing component 137, and/or the determining component 230 may be configured to or may comprise means for selecting the distance threshold and the dwell time threshold based at least on whether the person of interest 160 is wearing the mask.

For example, the selecting at block 406 may include selecting a first distance threshold that may indicate a first minimum distance between the person of interest 160 and each person 150 of the plurality of persons 150 if or when the person of interest 160 is wearing a mask. For example, if or when the person of interest 160 is wearing a mask, the selecting at block 406 may include selecting three feet as the distance threshold (i.e., a minimum distance required for compliance with the dynamic social distancing rules.) Alternatively or additionally, the selecting at block 406 may include selecting a second distance threshold that may indicate a second minimum distance between the person of interest 160 and each person 150 of the plurality of persons 150 if or when the person of interest 160 is not wearing a mask. For example, if or when the person of interest 160 is not wearing a mask, the selecting at block 406 may include selecting six feet as the distance threshold.

In some aspects, the selecting at block 406 may include selecting a first dwell time threshold that may indicate a first maximum duration of time that the person of interest 160 and each person 150 of the plurality of persons 150 may interact with and/or be within a proximity threshold to one another if or when the person of interest 160 is wearing a mask. For example, if or when the person of interest 160 is wearing a mask, the selecting at block 406 may include selecting 20 minutes as the dwell time threshold. Alternatively or additionally, the selecting at block 406 may include selecting a second dwell time threshold that may indicate a second maximum duration of time that the person of interest 160 and each person 150 of the plurality of persons 150 may interact with and/or be within a proximity threshold to one another if or when the person of interest 160 is not wearing a mask. For example, if or when the person of interest 160 is not wearing a mask, the selecting at block 406 may include selecting 40 minutes as the dwell time threshold.

Further, for example, the selecting at block 406 may be performed to automatically determine thresholds that are used to determine compliance with the dynamic social distancing rules. Such determinations may allow the video surveillance system 100 to identify the persons 150 that interacted with and/or been within a proximity threshold to the person of interest 160, and whether those persons 150 complied with the dynamic social distancing rules without the need for time and labor intensive manual processes. Thus, aspects presented herein may increase accuracy and effectiveness of enforcement of dynamic social distancing rules over conventional video surveillance systems.

For example, in an aspect, the computing device 130, the processor 133, the memory 135, the social distancing component 137, and/or the determining component 230 may be configured to or may comprise means for determining whether the at least one distance of the respective distances between the person of interest 160 and the remaining persons 150 of the plurality of persons 150 is less than the distance threshold.

For example, the determining at block 408 may include comparing the respective distances between the person of interest 160 and the remaining persons 150 of the plurality of persons 150 with the selected distance threshold. That is, if or when the respective distances exceeds the selected distance threshold, the determining at block 408 may include determining that the plurality of persons 150, including the person of interest 160, is not in violation of the dynamic social distancing rules. Alternatively or additionally, if or when at least one of the respective distances does not exceed the selected distance threshold, the determining at block 408 may include determining that the plurality of persons 150, including the person of interest 160, are in violation of the dynamic social distancing rules.

Further, for example, the determining at block 408 may be performed to automatically determine compliance with the dynamic social distancing rules. Such determinations may allow the video surveillance system 100 to identify the persons 150 that interacted with and/or been within a proximity threshold to the person of interest 160, and whether those persons 150 complied with the dynamic social distancing rules without the need for time and labor intensive manual processes. Thus, aspects presented herein may increase accuracy and effectiveness of enforcement of dynamic social distancing rules over conventional video surveillance systems.

For example, in an aspect, the computing device 130, the processor 133, the memory 135, the social distancing component 137, and/or the determining component 230 may be configured to or may comprise means for determining whether the dwell time of the plurality of persons 150 exceeds the dwell time threshold.

For example, the determining at block 410 may include comparing the dwell time of the plurality of persons 150 with the selected dwell time threshold. That is, if or when the dwell time of the plurality of persons 150, including the person of interest 160, exceeds the dwell time threshold, the determining at block 410 may include determining that the plurality of persons 150, including the person of interest 160, is in violation of the dynamic social distancing rules. Alternatively or additionally, if or when the dwell time of the plurality of persons 150, including the person of interest 160, does not exceed the dwell time threshold, the determining at block 410 may include determining that the plurality of persons 150, including the person of interest 160, is not in violation of the dynamic social distancing rules.

Further, for example, the determining at block 410 may be performed to automatically determine compliance with the dynamic social distancing rules. Such determinations may allow the video surveillance system 100 to identify the persons 150 that interacted with and/or been within a proximity threshold to the person of interest 160, and whether those persons 150 complied with the dynamic social distancing rules without the need for time and labor intensive manual processes. Thus, aspects presented herein may increase accuracy and effectiveness of enforcement of dynamic social distancing rules over conventional video surveillance systems Referring to FIG. 5, in an optional or additional aspect that may be combined with any other aspect, in block 502, the method 300 may include determining that the dwell time of the plurality of persons exceeds a preliminary dwell time threshold. For example, in an aspect, the computing device 130, the processor 133, the memory 135, the social distancing component 137, and/or the determining component 230 may be configured to or may comprise means for determining that the dwell time of the plurality of persons 150 exceeds the preliminary dwell time threshold.

For example, the determining at block 502 may include comparing the dwell time of the plurality of persons 150 with the preliminary dwell time threshold. That is, if or when the dwell time of the plurality of persons 150 exceeds the preliminary dwell time threshold, the determining at block 502 may include determining that the plurality of persons 150 is close to triggering a violation of the dynamic social distancing rules. Alternatively or additionally, if or when the dwell time of the plurality of persons 150 does not exceed the preliminary dwell time threshold, the determining at block 502 may include determining that the plurality of persons 150 is not in violation of the dynamic social distancing rules.

Further, for example, the determining at block 502 may be performed to determine whether the persons 150 are close to triggering a violation of the dynamic social distancing rules. Such determinations may allow the video surveillance system 100 to warn the persons 150 and/or other appropriate personnel that a violation of the dynamic social distancing rules is close to being triggered.

In this optional or additional aspect, at block 504, the method 300 may include generating a preliminary alert indicating that the plurality of persons have exceeded the preliminary dwell time threshold. For example, in an aspect, the computing device 130, the processor 133, the memory 135, the social distancing component 137, and/or the generating component 235 may be configured to or may comprise means for generating the preliminary alert indicating that the plurality of persons 150 have exceeded the preliminary dwell time threshold.

For example, the generating at block 504 may include generating, with the speaker 125, an audible alarm (e.g., a bell sound) and/or a audio message that may be audible by the persons 150. That is, the alarm from the speaker 125 may be audible within the area 115 comprising the persons 150. The audible alarm and/or audio message may indicate that the persons 150 are close to triggering a violation of the dynamic social distancing rules.

In some aspects, the generating at block 504 may include generating, with the display 127, textual, graphical, and/or video messages that may be visible by the persons 150. That is, the displayed alert message may be visible within the area 115 comprising the persons 150. The displayed alert messages may indicate that the persons 150 are close to triggering a violation of the dynamic social distancing rules. Alternatively or additionally, the displayed alert messages may indicate remediation steps that may be taken by the persons 150 to avoid triggering a violation of the dynamic social distancing rules.

In other optional or additional aspects, the generating at block 504 may include transmitting a notification indicating that a dynamic social distancing rule violation is close to being triggered. For example, the generating at block 504 may include transmitting a message (e.g., email, short message service ("SMS"), automated voice call) to one or more recipients comprising an indication that the persons 150 are close to triggering a violation of the dynamic social distancing rules. In some aspects, the notification may be transmitted to a third-party local to the environment 110, such as security personnel, building management personnel, and the like. Alternatively or additionally, the notification may be transmitted to a third-party remote to the environment 110, such as law enforcement, civil health authorities, and the like. In other optional or additional aspects, the notification may be transmitted to one or more persons associated with the area 115 comprising the persons 150. For example, if or when the environment 110 comprises an office building, the notification may be transmitted to personnel assigned to work in the area 115 comprising the persons 150.

In other optional or additional aspects, the message displayed by the display 127 may comprise a video clip of the video frames comprising the persons 150 that are close to triggering a violation of the dynamic social distancing rules. Alternatively or additionally, the transmitted message (e.g., email, SMS, automated voice call) may comprise the video clip of the video frames comprising the persons 150 that are close to triggering a violation of the dynamic social distancing rules.

Further, for example, the generating at block 504 may be performed notify the appropriate persons and/or personnel that a dynamic social distancing rule violation is close to being triggered. As such, the video surveillance system 100 may permit the automatic enforcement of the dynamic social distancing rules without the need for time and labor intensive manual processes. Thus, aspects presented herein may increase accuracy and effectiveness of the enforcement of dynamic social distancing rules over conventional video surveillance systems.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

In one or more aspects, the functions described herein may be implemented in hardware, software, firmware, or any combination thereof. If or when implemented in software, the functions may be stored or transmitted as one or more instructions or code on a computer-readable medium. The computer-readable medium (also referred to as computer-readable media) may include a computer storage medium which may be referred to as a non-transitory computer-readable medium. A non-transitory computer-readable medium may exclude transitory signals. Computer-readable media may include both computer storage media and communication media including any medium that may facilitate transfer of a computer program from one place to another. A storage medium may be any available media that can be accessed by a computer. By way of example, and not limitation, such computer-readable media can comprise RAM, ROM, electrically erasable programmable ROM ("EEPROM"), compact disc read-only memory ("CD-ROM") or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk and Blu-ray disc, where disks usually reproduce data magnetically, while discs usually reproduce data optically with lasers. Combinations of the above may also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of enforcing dynamic social distancing rules, comprising:
    monitoring video frames of one or more video feeds;
    classifying a plurality of persons in the video frames;
    calculating respective distances between each person of the plurality of persons and remaining persons of the plurality of persons;
    detecting mask usage of the plurality of persons, the mask usage indicating whether each person of the plurality of persons is wearing a mask;
    selecting a distance threshold based on the mask usage of the plurality of persons;
    measuring a dwell time of the plurality of persons, the dwell time indicating a duration of time that each person of the plurality of persons has been within a proximity threshold to the remaining persons of the plurality of persons;
    determining whether the plurality of persons are in violation of the dynamic social distancing rules based at least on the respective distances, the distance threshold, the mask usage, and the dwell time; and
    generating an alert in response to determining that the plurality of persons are in violation of the dynamic social distancing rules.

2. The method of claim 1, further comprising:
    obtaining identification information of a person of interest; and
    identifying a first person of the plurality of persons as the person of interest, wherein determining whether the plurality of persons are in violation of the dynamic social distancing rules comprises:
  selecting a dwell time threshold based at least on whether the person of interest is wearing the mask; and
  determining whether the dwell time of the plurality of persons exceeds the dwell time threshold.

3. The method of claim 1, further comprising:
determining that the dwell time of the plurality of persons exceeds a preliminary dwell time threshold; and
generating a preliminary alert indicating that the plurality of persons have exceeded the preliminary dwell time threshold.

4. The method of claim 1, wherein determining whether the plurality of persons are in violation of the dynamic social distancing rules comprises:
  selecting a dwell time threshold based at least on the mask usage of the plurality of persons; and
  determining whether the dwell time of the plurality of persons exceeds the dwell time threshold.

5. The method of claim 1, wherein generating the alert comprises providing a video clip of the video frames comprising the plurality of persons that are in violation of the dynamic social distancing rules.

6. The method of claim 1, wherein calculating the respective distances comprises:
  determining, based at least on a first size of a first bounding box around a first person of the plurality of persons, a first depth component of a first coordinate set of the first person;
  determining, based at least on a second size of a second bounding box around a second person of the plurality of persons, a second depth component of a second coordinate set of the second person; and
  calculating a physical distance between the first person and the second person based at least on the first depth component and the second depth component.

7. The method of claim 1, wherein detecting the mask usage of the plurality of persons comprises:
  providing the video frames to a facial feature detection algorithm, the facial feature detection algorithm being configured to extract respective facial features of the plurality of persons; and
  determining whether each person of the plurality of persons is wearing the mask based at least on the respective facial features of that person.

8. An apparatus for enforcing dynamic social distancing rules, comprising:
  a non-transitory memory storing computer-executable instructions; and
  a processor communicatively coupled with the non-transitory memory and configured to execute the computer-executable instructions to:
    monitor video frames of one or more video feeds;
    classify a plurality of persons in the video frames;
    calculate respective distances between each person of the plurality of persons and remaining persons of the plurality of persons;
    detect mask usage of the plurality of persons, the mask usage indicating whether each person of the plurality of persons is wearing a mask;
    select a distance threshold based on the mask usage of the plurality of persons;
    measure a dwell time of the plurality of persons, the dwell time indicating a duration of time that each person of the plurality of persons has been within a proximity threshold to the remaining persons of the plurality of persons;
    determine whether the plurality of persons are in violation of the dynamic social distancing rules based at least on the respective distances, the distance threshold, the mask usage, and the dwell time; and
    generate an alert in response to determining that the plurality of persons are in violation of the dynamic social distancing rules.

9. The apparatus of claim 8, wherein the processor is configured to execute further computer-executable instructions to:
  obtain identification information of a person of interest; and
  identify a first person of the plurality of persons as the person of interest,
  wherein to determine whether the plurality of persons are in violation of the dynamic social distancing rules comprises to:
    select a dwell time threshold based at least on whether the person of interest is wearing the mask; and
    determine whether the dwell time of the plurality of persons exceeds the dwell time threshold.

10. The apparatus of claim 8, wherein the processor is configured to execute further computer-executable instructions to:
  determine that the dwell time of the plurality of persons exceeds a preliminary dwell time threshold; and
  generate a preliminary alert indicating that the plurality of persons have exceeded the preliminary dwell time threshold.

11. The apparatus of claim 8, wherein to determine whether the plurality of persons are in violation of the dynamic social distancing rules comprises to:
  select a dwell time threshold based at least on the mask usage of the plurality of persons; and
  determine whether the dwell time of the plurality of persons exceeds the dwell time threshold.

12. The apparatus of claim 8, wherein to generate the alert comprises to provide a video clip of the video frames comprising the plurality of persons that are in violation of the dynamic social distancing rules.

13. The apparatus of claim 8, wherein to calculate the respective distances comprises to:
  determine, based at least on a first size of a first bounding box around a first person of the plurality of persons, a first depth component of a first coordinate set of the first person;
  determine, based at least on a second size of a second bounding box around a second person of the plurality of persons, a second depth component of a second coordinate set of the second person; and
  calculate a physical distance between the first person and the second person based at least on the first depth component and the second depth component.

14. The apparatus of claim 8, wherein to detect the mask usage of the plurality of persons comprises to:
  provide the video frames to a facial feature detection algorithm, the facial feature detection algorithm being configured to extract respective facial features of the plurality of persons; and
  determine whether each person of the plurality of persons is wearing the mask based at least on the respective facial features of that person.

15. A non-transitory computer-readable medium storing computer-readable instructions for enforcing dynamic social distancing rules, executable by a processor to:
- monitor video frames of one or more video feeds;
- classify a plurality of persons in the video frames;
- calculate respective distances between each person of the plurality of persons and remaining persons of the plurality of persons;
- detect mask usage of the plurality of persons, the mask usage indicating whether each person of the plurality of persons is wearing a mask;
- select a distance threshold based on the mask usage of the plurality of persons;
- measure a dwell time of the plurality of persons, the dwell time indicating a duration of time that each person of the plurality of persons has been within a proximity threshold to the remaining persons of the plurality of persons;
- determine whether the plurality of persons are in violation of the dynamic social distancing rules based at least on the respective distances, the distance threshold, the mask usage, and the dwell time; and
- generate an alert in response to determining that the plurality of persons are in violation of the dynamic social distancing rules.

16. The non-transitory computer-readable medium of claim 15, wherein the non-transitory computer-readable medium stores further computer-readable instructions, executable by the processor to:
- obtain identification information of a person of interest; and
- identify a first person of the plurality of persons as the person of interest,
- wherein to determine whether the plurality of persons are in violation of the dynamic social distancing rules comprises to:
  - select a dwell time threshold based at least on whether the person of interest is wearing the mask; and
  - determine whether the dwell time of the plurality of persons exceeds the dwell time threshold.

17. The non-transitory computer-readable medium of claim 15, wherein the non-transitory computer-readable medium stores further computer-readable instructions, executable by the processor to:
- determine that the dwell time of the plurality of persons exceeds a preliminary dwell time threshold; and
- generate a preliminary alert indicating that the plurality of persons have exceeded the preliminary dwell time threshold.

18. The non-transitory computer-readable medium of claim 15, wherein to determine whether the plurality of persons are in violation of the dynamic social distancing rules comprises to:
- select a dwell time threshold based at least on the mask usage of the plurality of persons; and
- determine whether the dwell time of the plurality of persons exceeds the dwell time threshold.

19. The non-transitory computer-readable medium of claim 15, wherein to generate the alert comprises to provide a video clip of the video frames comprising the plurality of persons that are in violation of the dynamic social distancing rules.

20. The non-transitory computer-readable medium of claim 15,
- wherein to calculate the respective distances comprises to:
  - determine, based at least on a first size of a first bounding box around a first person of the plurality of persons, a first depth component of a first coordinate set of the first person;
  - determine, based at least on a second size of a second bounding box around a second person of the plurality of persons, a second depth component of a second coordinate set of the second person; and
  - calculate a physical distance between the first person and the second person based at least on the first depth component and the second depth component; and
- wherein to detect the mask usage of the plurality of persons comprises to:
  - provide the video frames to a facial feature detection algorithm, the facial feature detection algorithm being configured to extract respective facial features of the plurality of persons; and
  - determine whether each person of the plurality of persons is wearing the mask based at least on the respective facial features of that person.

* * * * *